United States Patent [19]
Gala

[11] 4,243,847
[45] Jan. 6, 1981

[54] AUTOMATIC RESTORAL MECHANISM FOR A PUSHBUTTON KEY TELEPHONE INSTRUMENT

[75] Inventor: Babulal V. Gala, Huntsville, Ala.

[73] Assignee: GTE Automatic Electric Laboratories Incorporated, Northlake, Ill.

[21] Appl. No.: 34,522

[22] Filed: Apr. 30, 1979

[51] Int. Cl.³ .............................................. H04M 1/08
[52] U.S. Cl. ................................ 179/99 R; 179/164; 179/1 HS
[58] Field of Search ....................... 179/99, 164, 1 HS; 200/153 H

[56] References Cited

U.S. PATENT DOCUMENTS

| | | | |
|---|---|---|---|
| 2,199,686 | 5/1940 | Beyland | 179/99 A |
| 2,218,328 | 10/1940 | Curran et al. | 179/99 R |
| 2,273,530 | 2/1942 | King | 179/99 H |
| 2,531,457 | 11/1950 | McLarn | 179/99 R |
| 2,780,677 | 2/1957 | Schaufuss | 179/99 R |
| 2,802,904 | 8/1957 | Lehr et al. | 179/99 R |
| 3,601,559 | 8/1971 | Hineline, Jr. | 179/99 R |
| 3,903,070 | 9/1975 | Kunimine et al. | 179/99 R |
| 4,049,925 | 9/1977 | Laing et al. | 179/1 HS |

Primary Examiner—Gerald L. Brigance
Attorney, Agent, or Firm—Robert J. Black; Anthony Miologos

[57] ABSTRACT

A mechanism for automatically restoring an operated and depressed pushbutton line key in a multi-line key telephone instrument. When the telephone instruments handset is returned to the instruments cradle, the cradle rotates a cradle shaft which in turn rotates a hookswitch and a restoral actuator mounted to the shaft. The hookswitch actuator operates hookswitch contact springs placing the instrument in the "on-hook" condition and simultaneously the restoral actuator moves a button restoral arm which swings horizontally about a pivot. Restoral linkage mounted to the restoral arm transfers the arms' motion to an interlock lever which also pivots applying a mechanical force on the line key latch bar, unlatching the depressed pushbutton and restoring it to its original or non-operated position.

13 Claims, 4 Drawing Figures

AUTOMATIC RESTORAL MECHANISM FOR A PUSHBUTTON KEY TELEPHONE INSTRUMENT

BACKGROUND OF THE INVENTION

1. Field of the Invention

This invention relates in general to multiline key telephone instruments having line select pushbuttons switches and more particularly to a mechanism for automatically restoring an operated pushbutton.

2. Description of the Prior Art

It has become common in modern telephone systems to provide subscribers's telephone sets with means of enabling them to perform certain switching operations apart from those which usually result from removal or replacement of the telephone instrument handset with respect to the hookswitch or cradle. For instances, a plurality of pushbutton keys which enable a telephone subscriber to select any one of several telephone lines to converse with others.

Normally selection of a particular line is accomplished by activating or depressing a pushbutton into an activated position to enable that particular line to either answer a call or to place a call. A special or reset pushbutton may be provided which when depressed releases any depressed pushbutton. In prior art systems, when the subscriber has completed a particular phone call he pushed a reset button in order to cut-off his telephone receiver from a partciular telephone line, thus enabling others to use the circuit without interference. The reset button technique suffered from the obvious deficiency that people would often forget to push the reset button. This resulted in interference with subsequent users of that particular line.

Thus, it becomes advantageous to provide a mechanism for automatically restoring a depressed line selection pushbutton after a call has been completed. Such mechanisms for automatic button restoral are taught by U.S. Pat. No. 2,780,677 to L. Schaufuss, issued on Feb. 5, 1957, 3,601,559 to E. S. Hineline, Jr., issued Aug. 24, 1971 and 3,903,070 to I. Kunimine, issued Sept. 2, 1975. Such systems have been overly complicated from a mechanical standpoint making them costly to manufacturer and install and, required many critical adjustments to operate dependably.

Therefore, it is an object of the present invention to provide a simple, effective, pushbutton restoral mechanism for restoring a depressed line key pushbutton by replacing the telephone instruments handset on the telephone cradle.

SUMMARY OF THE INVENTION

In accomplishing the object of the present invention there is provided a key telephone instrument base including a cradle hook arranged to accept an included telephone handset thereon. The face panel of the base further includes a key strip having a number of pushbutton line keys manually operable into a depressed or activated position. The line keys are held in the depressed position by an included latch bar which when pulled releases the depressed line key to return to a restored position.

The mechanism of the present invention responds to the placement of the telephone handset on the cradle hook to restore whatever pushbutton might be depressed at that time. The weight of the handset on the cradle hook causes the cradle to arc downward rotating a cradle shaft mounted to the cradle hook. The cradle shaft includes a restoral actuator and hookswitch actuator which rotate along with the cradle shaft from a resting position. The hookswitch actuator closes a selected pair of spring contacts adjacent the hookswitch actuator placing the telephone set in an "on-hook" condition and storing spring energy. Simultaneously, the restoral actuator moves causing a horizontal movement in a first end of a restoral arm which rests freely on the cradle shaft adjacent to the restoral actuator when it is in its resting position. The restoral arm is pivotally mounted and arranged to swing horizontally about its mid-point. As the first end swings the arm pivots causing an opposite horizontal movement in a second and opposite end which pulls on a restoral linkage. The restoral linkage transmits the opposite horizontal movement to an interlock lever and linkage spring. The interlock lever is hooked on the latch bar which when moved by the restoral linkage applies a mechanical force to the latch bar releasing the depressed line key and allowing it to return to its restored position. The spring also expands storing spring energy when pulled by the restoral linkage and stays in the expanded condition until the handset is removed.

When the handset is removed from the cradle hook, the spring energy stored in the spring contacts acts on the hookswitch actuator rotating the cradle shaft, cradle hook and restoral actuator upward to their resting position. Simultaneously the linkage spring releases its spring energy pulling on the restoral linkage pivoting the restoral arm and returning the restoral arms first end to its resting position. Thus the restoral feature is reset.

The restoral feature may be defeated by adjusting the restoral actuator away from the restoral arm to prevent engagement with the restoral arm when the cradle shaft rotates in response to the placement of the handset on the cradle hook.

BRIEF DESCRIPTION OF THE DRAWINGS

A better understanding of the invention may be had from the consideration of the following detailed description taken in conjunction with the accompanying drawings in which.

DESCRIPTION OF THE PREFERRED EMBODIMENT

Figure 1:
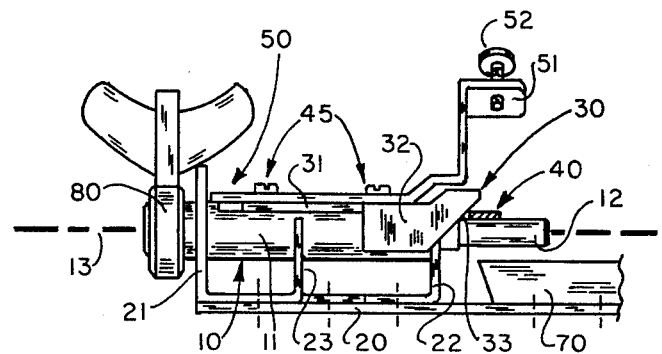
FIG. 1 is an elevational view showing the mechanical relationship of the cradle shaft, cradle hook, hookswitch and restoral actuators in accordance with the present invention.
Figure 2:
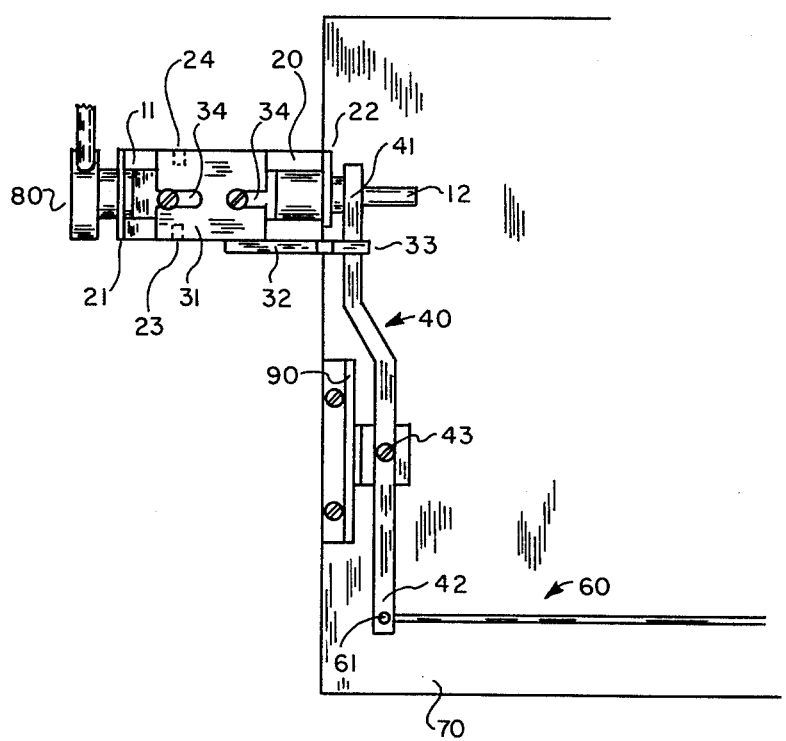
FIG. 2 is top planar view of FIG. 1 including the restoral arm and a portion of the restoral linkage.
Figure 3:
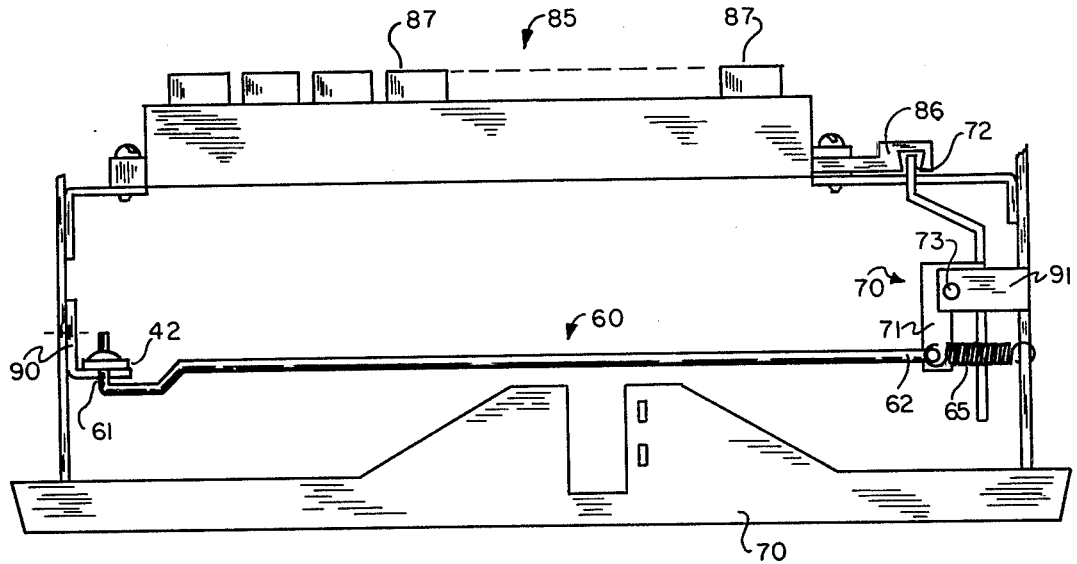
FIG. 3 is an elevational view showing the mechanical relationship between the restoral linkage, linkage spring interlock lever and key strip in accordance with the present invention.

Referring to the accompanying drawings of the present invention, FIGS. 1, 2 and 3 illustrate the button restoral mechanism of the present invention. It should be noted that the button restoral mechanism with the exception of the cradle hook 80 and a portion of the cradle shaft 10 is intended to be mounted within the housing of a wall mounted key telephone instrument base. Furthermore, even though this embodiment teaches the use of the invention with wall mounted telephone instruments it would be obvious to those skilled in the art to substitute a different cradle to allow the instrument to operate as a desk unit and should not be limited thereto.

Turning now to FIG. 1 the button restoral mechanism is comprised of a cradle shaft shown generally as 10 and including a first section 11 having a circular cross section and a second section 12 also having a circular cross section of a diameter less than the first section 11. Section 12 is integrally mounted to section 11 and both rotate about a common axis 13. A hookswitch cradle 80 is fitted to one end of section 11 and cradle shaft 10 is mounted to base plate 70 of the key telephone instrument's base by a cradle shaft bracket 20. The cradle shaft first section 11 is arranged to be accepted within arms 21 and 22 of bracket 20 and be rotatably mounted thereat. A button restoral actuator 30 including a first rectangular portion 31 is placed within a recess of the cradle shaft section 11 and a second portion 32 is integrally mounted to the first portion 31 parallel to the cradle shaft 10. Cradle shaft bracket 20 also includes stop members 23 and 24 (24 not shown in FIG. 1) which engage portion 31 of actuator 30 and limit the arc of rotation of the cradle shaft. Portion 32 further includes an obliquely oriented cam edge 33 arranged to activate a restoral arm 40. A pair of slotted holes are arranged opposite each other on the actuator's first portion 31 and each are adapted to receive one of a pair of mounting fasteners 45 therein which are more clearly illustrated on FIG. 2. The fasteners are arranged to be accepted within threaded bores (not shown) within the cradle shaft first section. A hookswitch actuator 50 is mounted on the restoral actuator portion 31 by fasteners 45 and further includes an actuator arm 51 having a plastic screw 52 mounted thereon.

Turning now to FIG. 2 a restoral arm 40 is shown comprised of a strip of rigid material pivotly mounted by a fastener 43 to a key strip mounting bracket 90 at approximately its mid-point. A first end 41 of restoral arm 40 is placed on the cradle shaft's second section 12 and a restoral linkage 60 mounted to a second end 42 of arm 40.

Turning now to FIG. 3, a first end 61 of restoral linkage 60 is mounted to restoral arm second end 42 and the restoral linkage second end 62 mounted to an interlock lever shown generally as 70 at interlock lever end 71. A linkage spring 65 is also mounted to end 62 of linkage 60. Spring 65 and interlock lever 70 are mounted to a second key set mounting bracket 91.

A key set 85 of the type taught by U.S. Pat. No. 3,271,530 by R. E. Wirshing, including a latch bar 86 is mounted to key set brackets 90 and 91, employing any well known means for fastening the set to the brackets. Each pushbutton of key set 85 is arranged to be positionable between a restored position and an activated position. The activated position is accomplished by applying manual pressure to a single pushbutton 87 urging it downward until it engages the latch bar 86 which retains it in position. Each pushbutton further includes a compression spring mounted internally under each pushbutton.

When a pushbutton is selected and depressed the compression spring is compressed and is retained in the compressed position when the pushbutton is latched by the latch bar. A horizontal pulling force applied to the latch bar disengages the latch bar from the activated pushbutton allowing the now compressed spring to return to its normal uncompressed position and thus returning the pushbutton to its restored position. A more detailed operation of the key strip may be had by referring to the above mentioned patent.

End 72 of interlock lever 70 is hooked to latch bar 86. Interlock lever 70 is vertically and pivotally mounted to key set bracket 91 by mounting pin 73.

Figure 4:
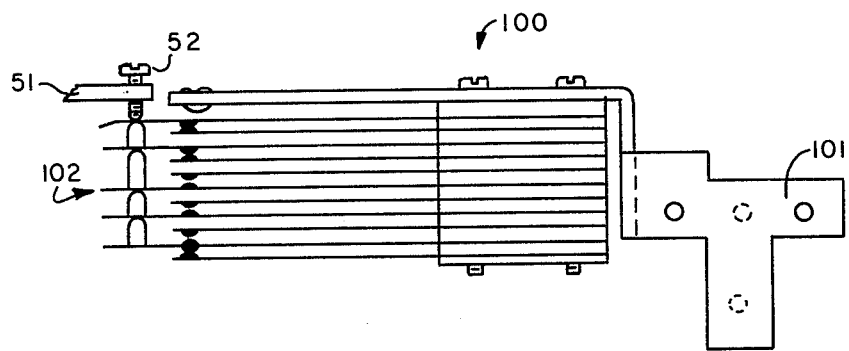
FIG. 4 is an elevational view showing the hookswitch contact set.

Turning now to FIG. 4 a hookswitch contact assembly 100 is mounted to key set mounting bracket 90 by a hookswitch bracket 101. The hookswitch assembly is comprised of a grouping of contact springs, insulators, contacts, etc. 102. The contact springs of 102 are normally biased in a first direction having a selected pair of springs closed indicative of the "off-hook" condition and arranged to be urged closed via hookswitch actuator arm 50 and plastic screw 52 which closes a selected pair of contact springs indicative of an "on-hook" condition.

Referring back to FIGS. 1, 2 and 3 the operation of the button restoral and hookswitch mechanism will now be discussed.

Typically to initiate a call or to answer an incoming call on the key telephone instrument the handset is withdrawn from the cradle hook which via the hookswitch contacts opens the line and a pushbutton is then dipressed to either select a line in order to place a call or to answer a call. When the call is terminated the handset is then again replaced on the cradle hook. With the restoral feature activated (the disabling of the restoral feature will be discussed later) the placement of the handset applies a downward force on the cradle hook 80. This downward force causes the cradle shaft 10 to rotate from a resting position in a first clockwise direction about axis 13. As the cradle shaft rotates, restoral actuator 30 also rotates from its resting position in a clockwise direction until stopped by stop member 23 allowing cam edge 33 to move end 41 of arm 40 horizontally across the cradle shaft section 12. It should be noted in the resting position end 41 of the restoral arm rests adjacent to cam edge 33 as shown in FIG. 1.

Thus actuator 30 via cam edge 33 and restoral arm 40 and end 41 translates the rotational motion of cradle shaft 11 to a horizontal motion. Arm 40 then swings horizontally about its mounting 43 which applies a horizontal motion at end 42 opposite that of end 41. Restoral linkage 60 is pulled in this opposite direction via its connection at end 61 and applies a mechanical force to expand linkage spring 65 while simultaneously pulling end 71 of interlock lever 70. Interlock lever 70 thus pivots about its pivot point 73 and applies a mechanical force opposite that of end 71 at end 72. End 72 swings outward and applies a mechanical force against latch bar 86 which unlatches the activated pushbutton allowing the pushbutton to return to its restored position. The mechanism remains in this operated condition and spring 65 expanded until the handset is removed from the cradle.

Simultaneously as the pushbutton restoration feature operates hookswitch actuator 50, via arm 51, plastic screw 52 is urged against the contact assembly closing selected pairs of contact springs 102 normally associated with the "on-hook" condition. Again the closing of the associated contacts stores spring energy.

When the handset is lifted the force supplied to the cradle hook by the handset is relieved allowing the hookswitch contacts to release their spring energy and to return to their normal "off-hook" condition urging the hookswitch actuator upward via plastic screw 52, arm 51, rotating cradle shaft 10 and restoral actuator 30, to its resting position in a second and counter clockwise direction against stop member 24 (shown on FIG. 2). Simultaneously, linkage spring 65 releases its spring energy returning to its unexpanded condition which pulls restoral linkage 60 and restoral arm 40 back to the resting position with end 41 adjacent restoral actuator cam edge 33.

If for any reason the button restoral function is desired to be the deactivated, threaded fasteners 45 may be loosened and restoral actuator 30 slidably moved toward cradle hook 80 until it stops and fasteners 45 are then re-tightened. This disengages the cam edge 33 from restoral arm end 41. Now when the handset is placed on the cradle hook the rotation of the actuator 30 in the first or clockwise direction does not act on the restoral arm end 41 and thus deactivates the restoral feature. To again reactivate the restoral feature fasteners 45 may be loosened and actuator 30 slidably moved toward the restoral arm until cam edge 33 touches end 41 of arm 40 and the fasteners 45 are again re-tightened.

This design allows for a movable cradle for a multi-line key telephone system which provides for mechanical button restoral and an easy and accurate means for deactivating or reactivating the automatic button restoral feature when desired.

The present invention has been described with reference to a specific embodiment thereof, for the purpose of illustrating the manner in which the invention may be used to advantage, and it will be appreciated by those skilled in the art that the invention is not limited thereto. Accordingly any and all modifications, variations or equivalent arrangements which may occur to those skilled in the art should be considered to be within the scope of the invention.

What is claimed is:

1. Pushbutton restoring means for a key telephone instrument, said key telephone instrument including a base and at least one pushbutton mounted on said base, said pushbutton selectively operable between a restored and activated position, said pushbutton manually activated and retained in said activated position by a latch bar engaging said pushbutton, said restoring means comprising:

rotating means including first and second sections said rotating means disposed to be manually rotated in a first directions;

actuating means including a cam edge, selectively mounted on said rotating means first section and disposed to be manually moved into a first position enabling said pushbutton restoring means and alternatively manually moved into a second position disabling said pushbutton restoring means;

motion translating means pivotly mounted and including first and second ends, said first end arranged to be movable between a first and second position, said motion translating means first end resting on said rotating means second section adjacent to and in contact with said actuating means cam edge in said first position when said actuating means is selected into said pushbutton restoring enabling position and said cam edge moved away from said motion translating means first end when said actuating means is selected into said pushbutton restoring disabling position; and motion transfer means including a first end mounted to said motion translating means second end and an opposite end communicating with said latch bar;

said actuating means selected into said pushbutton restoring enabling position and said rotating means manually rotated in said first direction and said actuating means simultaneously following said rotating means, said actuating means cam edge moving said motion translating means first end to said second position, translating said rotational motion to a horizontal motion, said motion translating means second end simultaneously moved in an opposite direction and said motion transfer means following said opposite motion and applying mechanical force on said latch bar to disengage said latch bar from said pushbutton, thereby releasing said pushbutton to said restored position, and alternatively said actuating means selected into said pushbutton restoring disabling position and said rotating means manually rotated in said first direction, said actuating means simultaneously following said rotating means and said actuating means cam edge falling short of said translating means first edge failing to move said translating means first end to said second position, thereby retaining said pushbutton in said activated position.

2. Pushbutton restoring means as claimed in claim 1, wherein: said key telephone set includes a handset and said rotating means first section is a shaft circular in cross section said first section including a first end having a handset cradle mounted thereto, said handset cradle disposed to have said handset placed thereon, said first section including a second end having said rotational means second section integrally mounted thereat, said second section being a shaft circular in cross section and having a diameter less then said first section, said first and second sections forming a cradle shaft rotating about a common axis.

3. Pushbutton restoring means as claimed in claim 2, wherein: said cradle shaft is rotatably mounted to said key telephone set by a cradle shaft bracket, said bracket including a first stop portion arranged to define the end most limit of rotational travel of said cradle shaft in said first direction.

4. Pushbutton restoring means as claimed in claim 2, wherein: said actuating means is comprised of a button restoral actuator having first and second portions, said first portion generally rectangular and slidably mounted to said cradle shaft and said second portion integrally mounted to an edge of said restoral actuator first portion, said second portion including an end obliquely oriented and forming said cam edge.

5. Pushbutton restoring means as claimed in claim 1, wherein: said key telephone set base includes a mounting bracket said bracket mounted to said base; and said motion translating means comprises a restoral arm, said arm being a longitudinal strip of rigid material pivotally mounted to said mounting bracket at said restoral arms mid-point allowing said arm to pivot horizontally about said mid-point.

6. Pushbutton restoring means as claimed in claim 4, wherein: said motion transfer means comprises a restoral linkage, said linkage being a rigid wire.

7. Pushbutton restoring means as claimed in claim 4, wherein: there is further included mounting means comprised of at least one threaded fastener and said cradle shaft includes at least one threaded bore arranged to accept said fastener and said restoral actuator includes at least one slot longitudinally oriented on said first portion adapted to accept said threaded fastener therein and said actuator slidably movable along said fastener to allow said actuator to be selectively positioned on said cradle shaft between said pushbutton restoring enabling position and said pushbutton restoring disabling position.

8. Pushbutton restoring means as claimed in claim 6, wherein: said key telephone instrument base includes a second mounting bracket said bracket mounted to said base, said restoral linkage including a second end mounted to an interlock lever and a linkage spring having one end mounted to said restoral linkage second end and an opposite end mounted to said second mounting bracket, said spring movable between an expanded and normal position.

9. Pushbutton restoring means as claimed in claim 8, wherein: in response to said opposite movement of said linkage, said linkage spring expands and said interlock lever applies a mechanical force against said latch bar to disengage said latch bar and render said pushbutton restored.

10. Pushbutton restoring means as claimed in claim 9, wherein: said cradle shaft is mechanically rotated in a second direction and said restoral actuator follows said cradle shaft, said linkage spring returning to said normal position applying a pulling force on said linkage, said motion translating means second end following said motion and said motion translating means first end displaced in a motion opposite said second end motion and returning said first end to said first position.

11. Pushbutton restoring means as claimed in claim 10, wherein: said handset is manually placed on said handset cradle displacing said handset cradle to manually rotate said cradle shaft clockwise in said first direction and said handset manually removed from said handset cradle to mechanically rotate said cradle shaft counter clockwise in said second direction.

12. Pushbutton restoring means as claimed in claim 11, wherein: said cradle shaft further includes a hookswitch actuator mounted to said cradle shaft, movable to a first and to a second position in response to said cradle shafts first and second direction rotations respectively.

13. Pusbutton restoring means as claimed in claim 12, wherein: there is included at least two line contact springs said contact springs internally mounted in said key telephone set base and normally biased closed, said contacts urged open by said hookswitch actuator in response to said actuator first position indicative of an "on-hook" condition and alternatively allowed to close urging said actuator into said second position indicative of an "off-hook" condition.

* * * * *